(12) United States Patent
Schuhn et al.

(10) Patent No.: US 12,251,886 B2
(45) Date of Patent: Mar. 18, 2025

(54) METHOD FOR PRODUCING FLEXIBLE TUBE BODIES FOR PACKAGING TUBES, FLEXIBLE TUBE BODY FOR PACKAGING TUBES, AND DEVICE FOR PRODUCING FLEXIBLE TUBE BODIES FOR PACKAGING TUBES

(71) Applicant: PACKSYS GLOBAL AG, Rüti (CH)

(72) Inventors: Daniel Schuhn, Zürich (CH); Ulrich Esser, Rüti (CH)

(73) Assignee: PACKSYS GLOBAL AG, Rüti (CH)

( * ) Notice: Subject to any disclaimer, the term of this patent is extended or adjusted under 35 U.S.C. 154(b) by 564 days.

(21) Appl. No.: 17/293,167

(22) PCT Filed: Nov. 12, 2018

(86) PCT No.: PCT/EP2018/080957
§ 371 (c)(1),
(2) Date: May 12, 2021

(87) PCT Pub. No.: WO2020/098906
PCT Pub. Date: May 22, 2020

(65) Prior Publication Data
US 2021/0402711 A1    Dec. 30, 2021

(51) Int. Cl.
*B29C 65/00* (2006.01)
*B29C 65/02* (2006.01)
*B29L 23/00* (2006.01)

(52) U.S. Cl.
CPC ........ *B29C 66/02241* (2013.01); *B29C 65/02* (2013.01); *B29C 66/1162* (2013.01); *B29C 66/51* (2013.01); *B29L 2023/005* (2013.01)

(58) Field of Classification Search
CPC .............. B29C 66/02241; B29C 65/02; B29C 66/1162; B29C 66/51; B29C 66/305;
(Continued)

(56) References Cited

U.S. PATENT DOCUMENTS 8,851,787 B2   10/2014   Kelley et al.
2009/0151978 A1   6/2009   Moe et al.

FOREIGN PATENT DOCUMENTS

CN    1216498 A    5/1999
CN   103167989 A   6/2013
(Continued)

OTHER PUBLICATIONS

International search report for patent application No. PCT/EP2018/080957 dated Jul. 3, 2019.

*Primary Examiner* — James C Yager
(74) *Attorney, Agent, or Firm* — Bachman & LaPointe, P.C.

(57) ABSTRACT

The invention relates to a method for producing flexible tube bodies (18) for packaging tubes from a film substrate (1) which has a print, preferably on an outer side (2), and which has or consists of at least one weldable plastic layer and which comprises a first longitudinal edge side (8), which extends in a longitudinal direction, and a second longitudinal edge side (8') parallel thereto and spaced apart therefrom, wherein the film substrate (1) is shaped by shaping means (23) to form a tube, and the two longitudinal edge sides (8, 8') are in particular welded to one another with the formation of a longitudinal weld seam, wherein a strip (12) is arranged, in the region of the abutment point and/or of the longitudinal weld seam, in the interior (17) of the film substrate (1) shaped to form the tube and is connected, in particular welded, to the longitudinal edge sides (8, 8') at least in certain regions or portions. According to the invention, prior to the formation of the longitudinal weld seam, at least one longitudinal edge side (8') is shaped, in particular cut, in such a way that, in the film substrate (1) shaped to form the tube, the longitudinal edge sides (8, 8') bear against one another, in particular in abutting fashion, radially only in the (Continued)

region of the outer side (2) with at least one tip (9) formed by the shaping operation.

18 Claims, 2 Drawing Sheets

(58) Field of Classification Search
CPC ............ B29C 66/4322; B29C 66/7234; B29C 66/73921; B29C 66/0222; B29C 66/114; B29C 66/116; B29C 65/7894; B29C 65/7832; B29C 66/71; B29C 66/72321; B29C 65/4815; B29C 65/5042; B29C 65/7802; B29L 2023/005
See application file for complete search history.

(56) References Cited

FOREIGN PATENT DOCUMENTS

| | | |
|---|---|---|
| CN | 103796817 A | 5/2014 |
| EP | 0187541 A2 | 7/1986 |
| EP | 1884348 A1 | 2/2008 |
| EP | 2089213 A2 | 8/2009 |
| EP | 2004389 B1 | 1/2011 |
| EP | 2007567 B1 | 8/2011 |
| EP | 2630052 A2 | 8/2013 |
| EP | 2861505 A2 | 4/2015 |
| EP | 2004506 B1 | 11/2017 |
| JP | 4953966 A | 5/1974 |
| JP | 60101028 A | 6/1985 |
| JP | H05147128 A | 6/1993 |
| JP | 08104340 A | 4/1996 |
| JP | 08324599 A | 12/1996 |
| JP | 08324600 A | 12/1996 |
| JP | 2001206393 A | 7/2001 |
| JP | 3484542 B2 | 1/2004 |
| JP | 2014523354 A | 9/2014 |
| JP | 2015527258 A | 9/2015 |
| WO | 8802690 A2 | 4/1988 |
| WO | 2007113781 A3 | 12/2007 |
| WO | 2011012930 A1 | 2/2011 |
| WO | 2012052971 A2 | 4/2012 |
| WO | 2013186723 A2 | 12/2013 |
| WO | 2015/022174 A1 | 2/2015 |

METHOD FOR PRODUCING FLEXIBLE TUBE BODIES FOR PACKAGING TUBES, FLEXIBLE TUBE BODY FOR PACKAGING TUBES, AND DEVICE FOR PRODUCING FLEXIBLE TUBE BODIES FOR PACKAGING TUBES

BACKGROUND OF THE INVENTION

The present invention relates to a method for producing flexible tube bodies for packaging tubes and to flexible tube bodies for packaging tubes. Furthermore, the present invention relates to a device for producing flexible tube bodies for packaging tubes.

Generic tube bodies for packaging tubes, the methods for their production and the devices for their production are known from the state of the art in various forms. It is generally provided that longitudinal edge sides of a film substrate which preferably has a print on an outer side are deformed into a tube shape and that the film substrate is connected or solidified in the area of the longitudinal edge sides, a longitudinal weld seam being formed in the process.

It has been known for a long time that the longitudinal weld seam for producing the tube body can be realized as an overlapping weld seam of the longitudinal edge sides. This means that the longitudinal edge sides of the film substrate have or form an overlap in the course of the deforming into a tube body, the weld seam or longitudinal weld seam then being realized or placed in the area of the overlap. Before the welding takes place, the overlapping laminate edge or longitudinal edge side, i.e., the one located outside the tube, comes to rest on the overlapped laminate edge or longitudinal edge side, i.e., the one located inside the tube, in the overlap area.

For example, EP 0 187 541 A2 describes a corresponding method and tube bodies produced by means of the method. In said method, the occurrence of an unprinted line in the area of the weld seam is unavoidable for at least two reasons. Firstly, material which comes from the overlapping edge and which is located below the printed image is pushed onto the overlapped edge or the overlapped longitudinal edge side by the pressure during the pressing of the two longitudinal edge sides. This means that the material flows and forms a line on the print of the overlapped longitudinal edge side. Additionally, a non-welded area is formed by the material which gets onto the print, the non-welded area being a predetermined breaking point for the weld seam because of a notch effect.

As an alternative solution to an overlapping arrangement of the longitudinal edge sides of the film substrate during the transformation into a tube shape for forming a flexible tube body for packaging tubes, it has also been known for a long time for the longitudinal weld seam to be realized as a butt weld, which means that the longitudinal edge sides of the film substrate are disposed edge to edge or contact one another edge to edge and the longitudinal weld seam is formed in said arrangement of the longitudinal edge sides. Despite a reinforcement on the inner side or on the outer side, the longitudinal weld seams realized as butt welds often have a reduced stability compared to the laminate, in particular because, when the butt weld seam is formed, the barrier layer which is often disposed in the film substrate cannot be welded—for example in the case of aluminum—or can be welded merely partially—for example in the case of EVOH. However, at the same time, said barrier layer often makes a significant contribution to the mechanical stability of the film substrate, i.e., in particular outside the area of the longitudinal weld seam.

With respect to longitudinal weld seams in the form of butt welds, other problems may also occur in connection with possible reinforcement structures, for example on reinforcement strips which are known per se and which are applied to the inside or to the outside. In the case of reinforcement strips which are too thick, for example, problems may occur when the tube head is attached. Likewise, reinforcement strips which are too thick may cause problems when the final seam of the packaging tube is formed, the final seam being formed after filling a corresponding packaging tube.

In connection with methods for producing flexible tube bodies from a film substrate which preferably has a print on an outer side, in which the film substrate is deformed into a tube shape and is connected in the area of the longitudinal edge sides by forming a longitudinal weld seam, another problem is that, in the case of film substrates having a plastic barrier layer, the welding energy for forming the longitudinal weld seam can only or mainly or mostly be supplied from the outside, i.e., primarily in the area of the outer side and therefore in the area of the print. In this process, a phase transition of the material of the film substrate from solid to liquid on at least one or, more often, on both of the longitudinal edge sides on the surface of the film substrate and therefore on the potentially printed outer side is inevitable in order to form the longitudinal weld seam. This leads to the risk or the problem that the energy input for providing the welding energy for forming the longitudinal weld seam causes a displacement or breaking up of the print. If little energy is applied to the outer side of the film substrate to avoid damage to the print, i.e., in particular to avoid a displacement or breaking up of the print, the longitudinal weld seams formed in this way have an intact print; however, they bear the risk that a predetermined breaking point having a notch effect is formed. This is because a connection of the outer layer of the film substrate to itself, i.e., to the second longitudinal edge side in the area of the butt weld, which is too weak leads to breaking of the seam surface, i.e., of the weld seam in the area of the outer side of the film substrate, when it is folded, wherein, when it is folded further, the crack propagates into the inside of the weld seam and the stability of the damaged tube body is significantly reduced and is essentially ensured only by reinforcement strips disposed on the inner side, for example, a bursting of the tube body, in particular of the packaging tube, thus becoming more likely when it falls down or when another type of force is applied. Furthermore, such cracks or breaking edges on the surface of the tube body, i.e., in the area of the outer side of the film substrate, are not visually appealing.

For example, JP 3484542 B2 is known from the state of the art and relates, on the one hand, to the production of corresponding tube bodies from film substrates whose inner side or inner layer has reduced flowability; on the other hand, however, this specification also points out that the method described is also suitable for other, conventional film substrates in order to reduce a weld thickness to improve the final seal properties of the tube body. In a packaging tube produced according to JP 3484542 B2 or a corresponding tube body, i.e., using a film substrate whose inner side and outer side or inner layer and outer layer consist of polyethylene which has good flowability and which is used with a reinforcement strip which, according to the disclosure of the specification, has the same materials on its surfaces as on the inner side or on the inner layer of the film substrate, weld seams in which the reinforcement strip is at least partially pushed or sunk into the film substrate are formed as a result of the usual pressures and temperatures during the welding process and the inevitable flow of all heated components when a longitudinal butt weld seam is formed and the reinforcement strip is disposed on the inside.

Thus, JP 3484542 B2 anticipates the relevant teaching of subsequent EP 2 004 389 B1, whose alleged contribution to the existing state of the art is supposed to be that the reinforcement strip sinks at least partially into the film substrate. Significantly earlier specifications JP S4953966 A and JP S60101028 A also disclose corresponding reinforcement strips which at least partially sink into the film substrate during the connection.

JP H08324600 A discloses a method in which the longitudinal edge sides of the film substrate are provided with a stepped, in particular complementary stepped, structure. However, such a preparation of the longitudinal edge sides before the longitudinal weld seam is formed is disadvantageous and requires a particularly high degree of precision.

EP 2 089 213 A1 proposes a method for producing flexible tube bodies for packaging tubes in which a bead which is freshly extruded and which is in the plastic state, i.e., which has a temperature which is above the melting temperature, is used in order to directly or indirectly weld the longitudinal edge sides together in a planar arrangement or in an edge-to-edge arrangement. A problem of this method is that no plastic material or material of the bead enters between the longitudinal edge sides of the film substrate when the longitudinal edge sides are disposed edge to edge and that the longitudinal edge sides of the laminate itself are therefore not directly connected, in particular welded, to one another. If the longitudinal edge sides of the film substrate are disposed at such a distance that the material of the bead in the plastic state can enter between the longitudinal edge sides and can at least establish an indirect connection of the longitudinal edge sides, a small and consequently unprinted distance between the longitudinal edge sides is produced in a disadvantageous manner, said distance not being visually appealing either. Moreover, the method using the freshly extruded plastic bead is difficult to control.

As indicated above, EP 2 004 389 B1 discloses a method which at least partially provides an embedding of a reinforcement strip in a tube body for packaging tubes in the area of a longitudinal butt weld seam. This method provides that the film substrate of the tube body or the packaging tube is thinned or its thickness is reduced in the connection area or in the area of the longitudinal weld seam in the situation before the longitudinal weld seam is formed, the additionally introduced or embedded material of the reinforcement strip thus compensating or overcompensating for the corresponding thinning.

Other approaches to solving the problems mentioned above, all of which are unsatisfactory, however, are known from the following documents: EP 2 004 506 B1, EP 2 007 567 B1, WO 2011/012930 A1, EP 2 630 052 B1, EP 2 861 505 B1, JP H08 324599 A and JP H08 104340 A.

SUMMARY OF THE INVENTION

Starting from the state of the art described above and the problems occurring therein, the object of the present invention is to indicate a method for producing flexible tube bodies for packaging tubes, corresponding tube bodies for packaging tubes and a device for producing tube bodies for packaging tubes which allow the production of tubes of the highest printing quality from printed film substrates in which the longitudinal weld seam of the film substrate deformed into a tube shape in the area of the longitudinal edge sides should not be visible at all, if possible, and has particularly high mechanical stability.

With respect to the method, said object is attained by the features disclosed herein. With respect to the tube body, said object is attained by a tube body according to the features disclosed herein. With respect to the device for producing flexible tube bodies, the object is attained by a device according to the features disclosed herein.

According to the invention, the method for producing flexible tube bodies for packaging tubes from a film substrate preferably having a print on an outer side and having or consisting of at least one weldable plastic layer and comprising a first longitudinal edge side extending in a longitudinal direction and a second longitudinal edge side parallel thereto and spaced apart therefrom, the film substrate being deformed into a tube shape by means of deforming means and the two longitudinal edge sides being in particular welded to one another, a longitudinal weld seam being formed in the process, a strip being arranged in the area of the joint and/or of the longitudinal weld seam inside the film substrate deformed into the tube shape and being connected, in particular welded, to the longitudinal edge sides at least in some areas or sections, provides that, prior to the formation of the longitudinal weld seam, at least one longitudinal edge side is reshaped, in particular cut, in such a manner that, the longitudinal edge sides of the film substrate deformed into the tube shape contact one another, in particular edge to edge, radially only in the area of the outer side via at least one tip formed by the reshaping.

This realizes several advantages. Firstly and particularly advantageously, a relatively low energy application, in particular temperature application, to the outer side of the film substrate can be sufficient to allow a connection of the film substrate with itself on an opposite longitudinal edge side in the area of the outer side or in the area of an outer layer. This ensures, however, that the print on the outer side of the film substrate remains undamaged and possible cracking in the print is prevented. So a direct welding or butt welding of the outer side or of the outer layer to itself realized by low heat input is thus achieved to a certain depth in the area of the outer side or in the area of an outer layer of the film substrate, wherein, however, said depth is only a fraction of the total thickness of the film substrate.

Additionally, the method according to the invention allows the material of the strip to penetrate into a space between the longitudinal edge sides or an opening in the film substrate inside the film substrate deformed into the tube shape and to establish there a good and stable connection of the longitudinal edge sides without affecting the outer side of the film substrate deformed into the tube shape or without the material of the strip reaching the outer side. This means that the material of the strip does not penetrate over the entire thickness of the film substrate, but that the opening in the film substrate in the area of the longitudinal edge sides is filled with the strip material only to such an extent that the outer sides of the longitudinal edge sides of the film substrate are still contact one another edge to edge. In particular, no visible, unprinted gap is produced in the area of the longitudinal weld seam. Moreover, the strip, in particular the reinforcement strip, can enter into or form a connection to the film substrate on the inner side of the film substrate opposite to the outer side and can simultaneously establish an at least indirect connection of the longitudinal edge sides or of the edges of the longitudinal edge sides by the penetration of the material of the strip into the area between the longitudinal edge sides which, apart from the outer side or the outer layer, are not yet connected to one another by a longitudinal butt weld seam.

Surprisingly, it has been shown that the strip surface or the strip outer side, which comes into contact with the longitudinal edge sides and mainly with the inner layer of the film substrate deformed into the tube shape during the penetration mentioned above, does not necessarily have to be weldable to all layers of the film substrate or tube laminate in order to still obtain a mechanically stable tube. The loss of mechanical stability caused by unweldable interfaces within the seam can be compensated or even overcompensated for by suitable selection of the strip material and its geometry. As known from the state of the art, both surfaces of the strip of course have to be weldable to or compatible with the material of the inner side of the tube laminate or film substrate and preferably be made of the same material as the innermost layer of the tube laminate. The tube laminate or the film substrate preferably has one or several inner layers which can be welded to the strip surface. The outermost layer or outer side of the film substrate or laminate does not have to be weldable to the strip surface, because it is welded to itself. The outermost layer of the tube laminate can thus be a BOPET film which has particularly good printability, for example.

A first particularly preferred embodiment of the method can provide that, in the course of the formation of the longitudinal weld seam, the outer side of the film substrate is connected, in particular welded, in the area of the at least one tip of a longitudinal edge side by means of outer heating means after the inner side facing away from the outer side is connected, in particular welded, to the strip. So the longitudinal edge sides are brought into contact with a preferably heated, plasticized strip in a cold or non-heated state in the area of the inner side by applying pressure. In the area of the longitudinal edge sides, the outer side of the film substrate deformed into the tube shape is maintained in such a manner that the contact, in particular edge to edge, is preserved. This means that during the connection of the strip with the film substrate in the area of the longitudinal edge sides, the opening in the film substrate, which extends from the inner side to the outer side of the film substrate in the tube shape, is maintained and is at most partially filled with the material of the strip, not least so that the contacting arrangement of the longitudinal edge sides in the area of the outer side is not pushed apart. The connection, in particular welding, of the strip to the film substrate is preferably followed by a connection, in particular welding, of the film substrate to itself in the area of the outer side of the film substrate. This means that after the connection of the strip to the film substrate, the film substrate is finally welded to itself on the outer side in the area of the longitudinal edge sides.

In this way, the advantages mentioned above are realized in a particularly advantageous manner, because after the film substrate is connected to the strip, during which the arrangement of the longitudinal edge sides in the area of the outer side is maintained and, in particular, a gap formation is prevented, a gentle butt connection or butt weld seam of at least a longitudinal edge side reshaped to be pointed and an adjacent longitudinal edge side is formed or realized on the outer side, said butt connection or butt weld seam in particular not damaging or affecting the print and resulting in an apparently seamless realization of the tube body on the outer side, wherein connection of the strip, at least to the inner side of the film substrate or the longitudinal edge sides of the film substrate, and preferably also an area of the longitudinal edge sides which is not connected to one another have previously been formed, wherein this area does not affect or compromise the print of the outer side of the film substrate and the apparently seamless connection on the outer side of the film substrate, while still offering particularly high stability and particularly effective protection against a formation of a predetermined breaking point.

Particularly advantageously, it can be provided that in the course of the method, an edge, in particular a cutting edge, extending obliquely in relation to a thickness direction of the film substrate is produced when the at least one longitudinal edge side of the film substrate is reshaped, the bevel being oriented in such a manner that an opening widening from the outer side to the inner side is produced in the film substrate when the film substrate is deformed into the tube shape, in particular when the longitudinal edge sides are arranged in contact with one another, in particular edge to edge, in the area of the outer side. The opening is limited in the area of the outer side by the areas of the longitudinal edge sides which contact one another but not connected to one another. So it is an opening which extends over the entire thickness of the film substrate and not a recess or depression, even if the width of the opening is minimal, especially in the area of the outer side of the film substrate, because of the sections of the longitudinal edge sides which contact one another.

It can preferably be taken into account that stresses, such as shear stresses, are already induced during the deforming of the film substrate into a tube or into a tube shape itself, said stresses per se counteracting a formation of an opening which widens from the outer side to the inner side. Conversely, however, this also means that the bevel of the edge, in particular the cutting edge, can be realized sharply with respect to the thickness direction of the film substrate, because the bevel is reduced or compensated for to some extent by the deforming of the film substrate into the tube shape; this means that even if the bevel is realized sharply, only a relatively unpronounced opening which widens to the inside is realized in the radial profile of the film substrate deformed into the tube shape.

A particularly preferred embodiment of the method according to the invention can provide that the longitudinal edge sides are reshaped in such a manner that the opening widening from the outer side to the inner side encloses an angle of 5° to 50°, preferably of 10° to 40°. This angle is determined in the state of the film substrate deformed into the tube shape. Preferably, this realizes that the material of the strip, in particular of the reinforcement strip, can penetrate into a radially inner part of the opening—from which the area of the outer layer of the film substrate is preferably excluded—and realizes there a connection to the inner side of the film substrate and an at least indirect connection of the longitudinal edge sides in the area of the longitudinal edge sides without affecting the outer side and the print there.

Another particularly preferred embodiment of the method can additionally provide that both longitudinal edge sides of the film substrate are reshaped, in particular cut, two tips formed by the reshaping, in particular the cutting, thus contacting one another, in particular edge to edge, radially in the area of the outer side when the film substrate is deformed into the tube shape. Particularly advantageously, this reduces the amount of energy required for the realization of the butt weld seam in the area of the outer side of the film substrate and therefore reduces the risk of affecting the print on the outer side of the film substrate. Additionally, a particularly advantageous design, e.g. a symmetrical design, of the opening between the longitudinal edge sides below the connection in the area of the outer side of the longitudinal edge sides can be realized by the reshaping or the cutting of the longitudinal edge sides on both sides.

Another particularly preferred embodiment of the method can additionally provide that, in the course of a trimming step, at least one longitudinal edge side is cut in the longitudinal direction by means of a trimming tool, in particular a trimming knife, a trimming strip separated from the film substrate being produced in the process, wherein the trimming strip is arranged as a strip in the area of the joint of the longitudinal edge sides and/or in the area of the longitudinal weld seam within the film substrate deformed into the tube shape and is welded to the film substrate, in particular to the longitudinal edge sides. This approach is preferably enabled when the inner side and outer side of the film substrate can be welded; however, this is the case for all film substrates or laminates which are suitable for lap welding.

The use of a trimming strip initially separated from the film substrate suitable for the lap welding as a strip or reinforcement strip has various advantageous effects. Firstly, material compatibility and thus weldability of the film substrate on the one hand and the strip on the other hand is ensured. The film substrate and the trimming strip, which is inserted as a strip or reinforcement strip into the inside of the tube shape and is connected, in particular welded, to the film substrate there, have the identical material composition and material sequence, in particular layer sequence, as the film substrate itself. Accordingly, a twisting of the strip or trimming strip by 180° in the longitudinal direction in relation to the film substrate, for example, can ensure that the contacting materials or layers in the area of the inner side of the film substrate deformed into the tube shape are identical or are made of identical material. Alternatively, the strip can be used without twisting, which ensures identical, i.e., highest possible, material compatibility on the inner side and thus an optimal closing process after filling, i.e., when the final seam is produced.

Additionally, a barrier layer disposed in the film substrate and consequently also in the trimming strip which is used as a strip for the connection to the film substrate deformed into the tube shape can cause a mechanical stabilization of the weld seam, in particular of the longitudinal weld seam, and improve the barrier effect of the seam in which the barrier has a—albeit very limited—gap. It is particularly advantageous if the connection of the strip with the longitudinal edge sides which are already connected to one another at least in the outer area or on the outer side is realized or performed in such a manner by the applied pressure that said barrier layer is covered or shielded and is thus not accessible from the inside of the tube body. This can be achieved, for example, by causing a flow, in particular a flow around the barrier layer, in the course of the heating of the strip and of the connection to the film substrate, the flow ensuring that the barrier layer is enclosed or covered by the material of the strip, in particular by layers of the strip, at the sides.

If the trimming strip is used as a strip for the connection, in particular welding, to the longitudinal edge sides at least in some areas or sections, it is additionally particularly advantageous if the corresponding trimming strip has no print. This is because this ensures that no print is arranged inside the tube body of the packaging tube and may potentially come into contact with the tube filling, or that the stability of the seam and/or the final seal is affected. Accordingly, for example, another cutting of the trimming strip can be provided in addition to the separation of the trimming strip in order, for example, to separate printed areas or edge areas.

Another particularly preferred embodiment of the method can provide that during or after the separation of the trimming strip from the film substrate, in particular before it is fed into the inside of the film substrate deformed into the tube shape, at least one side of the trimming strip itself is cut in the longitudinal direction by means of trimming tools, in particular by means of trimming knives.

Another advantageous embodiment of the method can provide that between the separation of the trimming strip from the film substrate and its insertion into the inside of the film substrate deformed into the tube shape, the trimming strip is temporarily stored on a storage means. This is particularly advantageous if the trimming strip also stretches or becomes longer in its longitudinal direction, in particular in the course of a heating, when it is used as a strip or reinforcement strip for the tube body, the throughput or the need for the trimming strip thus being lower than the need for the length of the film substrate.

Furthermore, another particularly preferred embodiment of the method can provide that the strip, in particular the trimming strip, is heated by means of inner heating means and is inserted into the inside of the film substrate deformed into the tube body and is connected to the film substrate, in particular on the inner side of the film substrate and in parts of the opening in the area of the longitudinal edge sides, in a heated and therefore softened, plastic state. The preheating of the strip or trimming strip has a number of advantages. Firstly, this allows a facilitated or improved positioning of the trimming strip or strip, because low but nevertheless some adherence to a feeding means can be achieved in a heated and therefore softened, plastic state, a lateral displacement of the strip or trimming strip thus being less likely. Additionally, a particularly quick and particularly effective connection to the inner side of the film substrate deformed into the tube shape in the area of the longitudinal edge sides can be achieved in the heated state. Advantageously, this also serves the first or preliminary fixation of the position of the longitudinal edge sides to one another when the film substrate and the strip contact one another for the first time, the position of the longitudinal edge sides in the area of the outer side thus being fixed as well and ensuring the contact to one another. Moreover, a heated and softened strip or trimming strip particularly advantageously allows a quick penetration of the material of the strip into an opening, said opening being filled, between the longitudinal edge sides radially inside a connection of the outer sides of the longitudinal edge sides to one another, said connection being produced later and being disposed above the opening.

Furthermore, it can be particularly advantageously provided that during the connection to the film substrate on the inner side, the strip, in particular the trimming strip, is widened transverse to the longitudinal direction, the ratio of a width of the strip/trimming strip after the connection to the film substrate to an original width of the strip/trimming strip thus being greater than 1.5, the strip or trimming strip preferably also being flattened transverse to the longitudinal direction (L), in particular at the same time, the ratio of a height of the strip/trimming strip after the connection to the film substrate to the original height of the strip/trimming strip thus being smaller than $2/3$. In this way, it is advantageously achieved that the longitudinal seam or longitudinal weld seam has a low height and, moreover, a sufficient width.

Particularly preferably, the method can also provide that the strip, in particular the trimming strip, is placed on a continuously circulating contact belt and is inserted into the inside of the film substrate deformed into the tube body, in particular on the contact belt, by means of feeding means. Particularly advantageously, this allows a continuous feeding of the strip or trimming strip and a connection of the strip or trimming strip to the film substrate to be ensured.

With respect to the flexible tube body for packaging, in particular produced according to the method described above, made of a film substrate preferably having a print on an outer side, the film substrate having or consisting of at least one weldable plastic layer and comprising a first longitudinal edge side extending in a longitudinal direction and a second longitudinal edge side parallel thereto and spaced apart therefrom, the film substrate being deformed into a tube shape by means of deforming means and the two longitudinal edge sides being in particular welded to one another by means of a longitudinal weld seam, and a strip being arranged in the area of the joint and/or of the longitudinal weld seam inside the film substrate deformed into the tube shape and being connected, in particular welded, to the longitudinal edge sides at least in some areas or sections, the object mentioned above is attained according to the invention in that at least one longitudinal edge side is reshaped, in particular cut, in such a manner that the longitudinal edge sides of the film substrate deformed into the tube shape are directly connected to one another only in the area of the outer side in the radial direction via at least one tip formed by the reshaping, in particular the cutting. According to the invention, the connection is formed edge to edge in the area of the outer side of the film substrate.

In this way, largely identical advantages are achieved for the tube body as those disclosed with respect to the method described above. More precisely, the direct butt weld seam formed in the area of the outer side or in the area of an outer layer of the film substrate allows an optically apparently seamless connection or welding which does not show any recognizable interruption in the print applied to the outer side while being mechanically stable overall.

A first particularly preferred embodiment of the tube body can provide that the at least one reshaped longitudinal edge side of the film substrate has an edge, in particular a cutting edge, which extends obliquely in relation to a thickness direction of the film substrate in each case, the bevel being oriented in such a manner that an opening widening from the outer side to the inner side is produced when the film substrate is deformed into the tube shape and/or when the longitudinal edge sides are directly connected to one another. This opening allows the advantages and advantageous effects described above to be achieved.

Another advantageous embodiment of the tube body can additionally provide that the reshaping of the longitudinal edge sides and the direct connection of the longitudinal edge sides in the area of the outer side is realized in such a manner that the opening encloses an angle of 5° to 50°, preferably of 10° to 40°, in the state of the film substrate deformed into the tube shape. This also allows the advantages and advantageous effects described above to be achieved.

Likewise, it can be advantageously provided that the opening is at least partially filled with material of the strip or of the trimming strip, in particular with the exception of the area of the contacting outer sides of the longitudinal edge sides, preferably with the exception of the outer side and/or of the outer layer.

Furthermore, the tube body can particularly preferably be designed in such a manner that both longitudinal edge sides of the film substrate are reshaped in such a manner that two tips formed by the reshaping are directly connected to one another, in particular edge to edge, radially in the area of the outer side when the film substrate is deformed into the tube shape. In this way, a connection which requires only a minimum of thermal energy and therefore does not affect, in particular damage, the print on the outer side can be produced in the area of the outer side of the film substrate and an apparently seamless tube or an apparently seamless tube body is formed at the same time.

Another particularly preferred embodiment of the tube body can additionally provide that the strip is formed by a trimming strip of the film substrate, the trimming strip being separated from the film substrate in the course of a preceding trimming process. As explained above, this requires corresponding material compatibilities. This ensures the compatibility between the film substrate and the strip. Additionally, this ensures the weldability of the trimming strip to the inner side of the film substrate deformed into the tube shape in the area of the longitudinal edge sides, in particular when the trimming strip is rotated by 180°, because identical materials or identical layers come into contact with one another in this case. Moreover, when a trimming strip is used as a strip in film substrates having a barrier layer, the barrier layer also embedded in the trimming strip particularly advantageously has an advantageous impact on the mechanical stability of the longitudinal weld seam, provided that the barrier layer also makes a significant contribution to the stability in the tube laminate or film substrate.

With respect to a device for producing flexible tube bodies for packaging tubes from a film substrate preferably having a print on an outer side and having or consisting of at least one weldable plastic layer and comprising a first longitudinal edge side extending in a longitudinal direction and a second longitudinal edge side parallel thereto and spaced apart therefrom, the film substrate being deformed into a tube shape by means of deforming means and the two longitudinal edge sides being in particular welded to one another, a longitudinal weld seam being formed in the process, and a strip being furthermore arranged in the area of the joint and/or of longitudinal weld seam inside the film substrate deformed into the tube shape by means of feeding means and being connected, in particular welded, to the longitudinal edge sides at least in some areas or sections by means of connecting means, the object mentioned above is attained according to the invention by providing edge reshaping means for reshaping, in particular cutting, at least one longitudinal edge side before the longitudinal weld seam is formed, the deforming means for forming the tube shape of the film substrate being realized in such a manner that, the longitudinal edge sides of the film substrate deformed into the tube shape contact one another, in particular edge to edge, radially in the area of the outer side via at least one tip formed by the edge reshaping means.

With respect to the device for producing flexible tube bodies for packaging tubes, the idea according to the invention is thus realized in that the longitudinal edge sides or at least one longitudinal edge side is reshaped, in particular cut, by means of corresponding edge reshaping means, the reshaping or the cutting being performed in such a manner that a tip is formed or realized on at least one longitudinal edge side in the area of the outer side or in the area of an outer layer and in that the deforming means for deforming the film substrate into a tube shape are realized and/or disposed in such a manner that an arrangement without overlapping or an edge-to-edge arrangement of the longitudinal edge sides is ensured or enabled, but that this arrangement is established or provided in exactly such a manner that the corresponding outer sides or the outer layers contact one another, with the particularity that, at least on one side or on one longitudinal edge side, a tip formed by the reshaping, in particular the cutting, of the longitudinal edge side comes into contact with the opposite longitudinal edge side in the area of the outer side or in the area of the outer layer.

This also allows a direct connection, in particular a direct welding, of the longitudinal edge sides of the film deformed into the tube shape or of the film substrate deformed into the tube shape to one another in the area of the outer side or in the area of the outer layer with a very low energy input without creating a visible gap or without the risk of damaging or otherwise affecting the print on the outer side of the film substrate. It is thus possible to produce a continuously printed tube or a continuously printed tube body which has am almost invisible longitudinal seam or even appears to be seamless.

A first particularly preferred embodiment of the device according to the invention can provide that outer heating means are provided which are used to connect, in particular weld, the outer side of the film substrate in the area of the at least one tip of the longitudinal edge side when the longitudinal weld seam is formed, the outer heating means being disposed in such a manner that the connection of the outer side, in particular the direct connection of the outer layers to one another, takes place after the inner side facing away from the outer side has been connected, in particular welded, to the strip. A direct connection of the outer sides or materials in the outer layers which can be established with a correspondingly low energy input and does not affect the print on the outer side of the film substrate can particularly advantageously be achieved in this way. Accordingly, the dimensions of the outer heating means do not have to be particularly large or powerful, because a relatively low energy input is sufficient to accomplish a welding of the outer sides of the film substrate deformed into the tube shape.

Another preferred embodiment of the device can additionally provide that the edge reshaping means are disposed and realized in such a manner that during the reshaping of the at least one longitudinal edge side of the film substrate, an edge, in particular a cutting edge, extending obliquely in relation to a thickness direction of the film substrate is produced in each case, the bevel being oriented in such a manner that an opening widening from the outer side to the inside is produced when the film substrate is deformed into the tube shape, in particular if the outer sides of the longitudinal edge sides are arranged edge to edge or without overlapping.

Another particularly advantageous embodiment of the device can provide—in particular provided that laminates are processed whose upper side can be welded to their lower side—that a trimming tool is provided which cuts a longitudinal edge side in the longitudinal direction, at least in the course of a trimming step, in particular by means of a trimming knife, a trimming strip separated from the film substrate being produced in the process, wherein the trimming strip is arranged as a strip in the area of the joint of the longitudinal edge sides and/or of the longitudinal weld seam within the film substrate deformed into the tube shape and is welded to the film substrate, in particular to the longitudinal edge sides. A number of advantages are achieved in this way. Firstly, this allows a particularly material-saving production of the tube bodies, because no additional strip has to be provided and has to be inserted into the tube body; instead, a waste product of a potentially indispensable trimming step of the film substrate can be reused or recycled. Additionally, this does not pose any compatibility problems or problems with regard to the production of welds between the strip and the film substrate, because the film substrate and the strip have or comprise the same materials or the same layers. Finally, the barrier layer located in the film substrate and therefore in the trimming strip can contribute to the mechanical stabilization of the longitudinal weld seam.

Another preferred embodiment of the device can also provide inner heating means which heat and plastically soften the strip, in particular the trimming strip, the inner heating means being disposed in such a manner that the strip is inserted into the inside of the film substrate deformed into the tube shape in a heated and therefore softened state by means of feeding means and comes into contact with the longitudinal edge sides before the connection of the film substrate to itself is established in the area of the longitudinal edge sides on the outer side. Firstly, the heating and softening via the inner heating means ensures that a displacement of the strip or trimming strip is avoided or that a displacement is at least prevented. Additionally, a direct connection between the inner side of the film substrate in the area of the longitudinal edge sides and the strip or trimming strip is established in the heated and softened state of the strip or trimming strip when the strip contacts the film substrate in the area of the longitudinal edge side; particularly advantageously, said connection already fixes the relative position of the longitudinal edge sides in the area of the outer side before the corresponding connection of the film substrate to itself is established on the outer side. Furthermore, the prior heating and softening of the strip or of the trimming strip can particularly effectively ensure that the material of the strip or trimming strip can partially penetrate into a corresponding opening between the longitudinal edge sides, which extends over the entire thickness of the film substrate, and can lead to a good and secure, at least indirect, connection between the longitudinal edge sides without displacement, in particular pushing apart, of the contacting longitudinal edge sides in the area of the outer side which are not yet directly connected.

BRIEF DESCRIPTION OF THE DRAWINGS

Further advantages, features and details of the invention are apparent from the following description of preferred exemplary embodiments and from the drawings. In the drawings.

DETAILED DESCRIPTION

Figure 1:
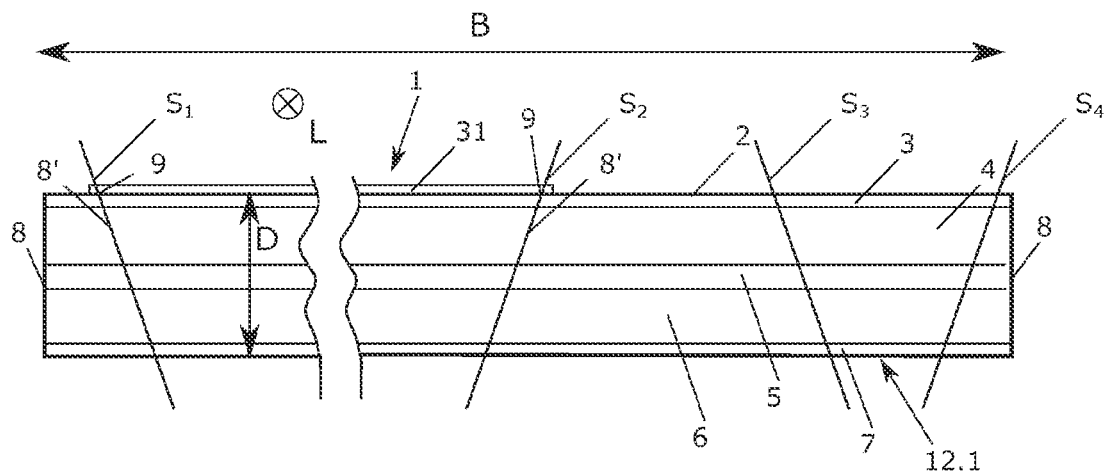
FIG. 1 shows a schematic illustration of a film substrate in the initial state and with indicated separation or cutting planes.

FIG. 1 shows a cross section of a film substrate which can be used in the present invention. Film substrate 1 has a print 31 on an outer side 2. Print 31 is often disposed on an outer layer 3 of film substrate 1; alternatively, it can be disposed below layer 3. Another layer structure 4 composed of one or several layers can be provided below outer layer 3. Layer structure 4 is followed by a barrier layer 5 on the side which faces away from outer side 2. Barrier layer 5 can be followed by another layer structure 6 which is followed by an inner layer 7.

In the course of the production of the flexible tube body from a film substrate 1, it can be provided, for example, that longitudinal edge sides 8 are reshaped, in particular cut, along longitudinal direction L of film substrate 1 extending into the drawing plane of FIG. 1, the reshaping, in particular cutting, being indicated by corresponding cutting planes $S_1$ and $S_2$ in FIG. 1. Original longitudinal sides 8 are transformed into new or cut longitudinal edge sides 8' by cutting planes $S_1$ and $S_2$. It is intended that at least one of cutting planes $S_1$, $S_2$ extends obliquely in relation to thickness direction D of film substrate 1 in such a way that they consequently form a tip 9 or tips 9, i.e., acute angles, in the area of outer side 2. As will be explained in more detail below, tips 9 formed by cutting planes $S_1$ and $S_2$ in the area of outer side 2 of film substrate 1 ensure that tips 9 can come into edge-to-edge contact to one another and that outer side 2 or outer layer 3 can thus be directly connected to one another in the area of tips 9 with a very low energy input when film substrate 1 is deformed into a tube shape.

Cutting planes $S_1$ and $S_2$ are situated in the printed area of print 31; this ensures that the entire tube is provided with a print. If a preprocessed film substrate is used which has already been trimmed, for example, the cutting along cutting plane $S_1$ is not necessary.

Moreover, additional facultative cutting planes $S_3$ and $S_4$ can be provided along width B of film substrate 1, wherein cutting planes $S_3$ and $S_4$ are used, for example, to produce a strip, in particular a trimming strip 12.1 which can then be inserted into the inside of a film substrate 1 deformed into the tube shape in order to produce the longitudinal weld seam, i.e., to connect the longitudinal edge sides of film substrate 1.

Cutting plane $S_3$ is situated outside the printed area of print 31; this ensures that no printing inks contaminate trimming strip 12.1. This is to be ensured for two reasons: Firstly, print 31 should not come into contact with the filling material. Additionally, print 31 reduces the weldability, which means that trimming strip 12.1 cannot be neatly welded to the seam or the final seal or the final seam cannot be produced as intended.

Figure 2:
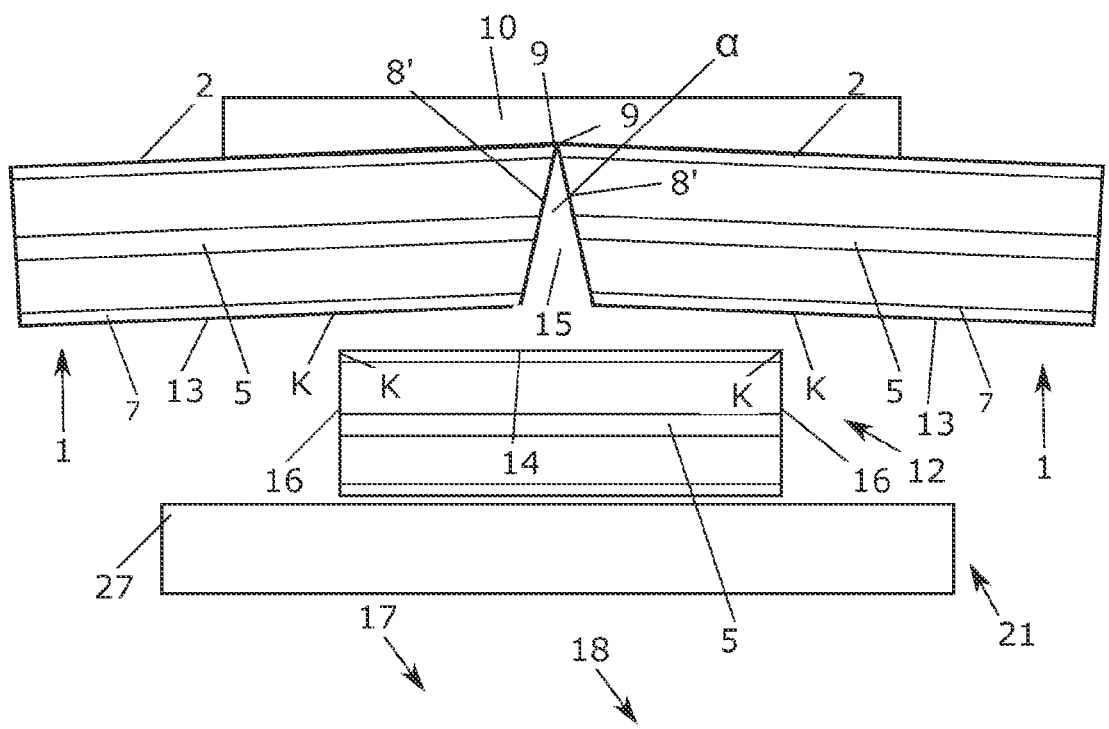
FIG. 2 shows a schematic illustration of a section of a tube body in the area of the longitudinal weld seam in a first process stage.

FIG. 2 shows a section of a flexible tube body according to the invention that is being produced. The section shows the area of longitudinal edge sides 8' shortly before inner side 13 or inner sides 13 of film substrate 1 are connected to a preferably heated and softened, in particular plastically softened strip 12. In the example of FIG. 2, the strip is any strip which is suitable for the welding process and the connection to film substrate 1. However, a trimming strip 12.1 like the one produced in an exemplary manner in FIG. 1 could also be used as a strip in the situation and the method according to FIG. 2.

FIG. 2 shows a section of a film substrate 1 deformed into the tube shape. As FIG. 2 shows, corresponding longitudinal edge sides 8' are disposed edge to edge without overlapping, in particular tips 9 thus contacting one another. This arrangement is provided or enabled by guiding means 10 of the device according to the invention and is maintained for the time being. In the illustration of FIG. 2, a corresponding strip 12 is already arranged below film substrate 1. Alternatively, a trimming strip 12.1 produced, for example, by cutting planes $S_3$ and $S_4$ as shown in FIG. 1 could be used. In contrast to film substrate 1, strip 12 can already be heated and softened, in particular in the area of the outer side. However, strip 12 still has a distance from film substrate 1, in particular from inner side 13 of film substrate 1. If strip 12 is a trimming strip produced by the cuts along cutting planes $S_3$ and $S_4$ in the illustration of FIG. 1, for example, a rotation of strip 12 by 180° about its longitudinal axis in relation to film substrate may be provided, identical materials or material layers thus facing one another on inner side 13 of film substrate 1 and on outer side 14 of strip 12, the identical materials or material layers thus being connectable, in particular weldable, to one another.

In a processing or method step which follows the illustration of FIG. 2, a contact and therefore a connection between film substrate 1 and strip 12 is established by reducing, for example continuously reducing, the distance between guiding means 10 and feeding means 27, which preferably comprises a continuously circulating belt 21, in a longitudinal direction perpendicular to the drawing layer, for example. A first contact and a first connection between film substrate 1 and strip 12 can thus be established in the area of contact points K, wherein the contact points expand or widen and become contact surfaces and the material of strip 12 penetrates into opening 15 of the film substrate as a result of the decreasing distance between guiding means 10 and feeding means 27 and the simultaneous pressure increase.

As the illustration of FIG. 2 shows, an opening 15 forms radially inward from outer side 2 of film substrate 1 when film substrate 1 is in the state deformed into the tube shape, wherein the width of opening 15 increases and is to be considered to be minimal in the area of tips 9. This is because even if tips 9 contact one another, they are not connected to one another, which is why a continuous opening in the film substrate is to be assumed, wherein the opening has a partially minimal or almost disappearing width but is not a recess which only extends over part of the thickness of the film substrate. Opening angle α of opening 15 can enclose an angle between 5° and 50°, preferably between 10° and 40°, for example.

In a situation of the method according to the invention following the illustration of FIG. 2 and the connection between film substrate 1 and strip 12 described above, a particularly gentle connection requiring little energy can be established between longitudinal edge sides 8' in the area of outer side 2 of film substrate 1 by outer heating means which are not shown in FIG. 2 and which can be disposed in the area of guiding means 10. If cutting planes $S_1$ and $S_2$ are suitably selected, said connection appears to be almost seamless and does not damage or affect said print.

FIG. 2 also shows that film substrate 1 and thus, in the production according to FIG. 1, strip 12 comprise a barrier layer 5. In the situation or process stage of FIG. 2, longitudinal edge sides 8' and edge sides 16 of strip 12 have areas where barrier layer 5 is exposed and could thus potentially come into contact with the tube contents to be disposed inside 17 of tube body 18. In general, however, such a contact between barrier layer 5 and inside 17 of the packaging tube or tube filling situated there should be avoided. An appropriate solution is provided in the state of the method and of tube body 18 according to the illustration of FIG. 3.

Figure 3:
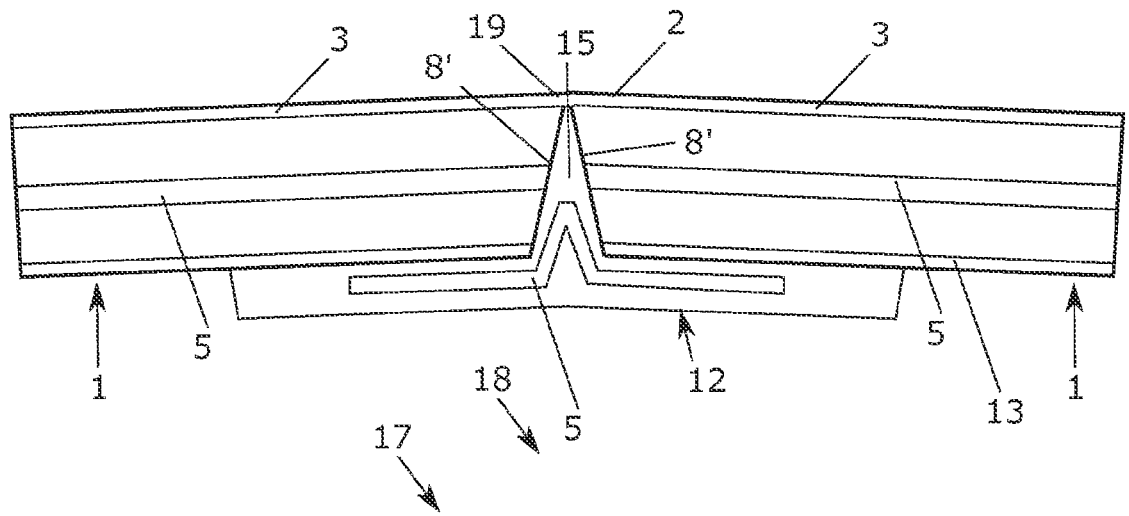
FIG. 3 shows a schematic illustration of a section of a tube body according to the invention in a second process stage.

As outlined above, a correspondingly direct connection of longitudinal edge sides 8' has been established on outer side 2 of film substrate 1 or in the area of outer layer 3 of film substrate 1 in the state of FIG. 3. The connection preferably extends over outer layer 3, which has a thickness of 10 μm to 50 μm, for example. However, said connection has been established only after already heated and softened strip 12 had been fed to and pressed against film substrate 1 in the area of longitudinal edge sides 8' on the inner side or inside 17 of film substrate 1 deformed into the tube shape. As a result of the first-performed and latter step, part of the material of strip 12 has partially penetrated or flowed into opening 15 shown in FIG. 2—in particular since strip 12 had been suitably heated and softened, in particular plastically softened—but only to such depth or such an extent that contacting tips 9 are not displaced, in particular pushed apart. The latter can be achieved by corresponding guiding means of the device (illustrated as guiding means 10 in a highly schematized manner). In the present case, the subsequent connection of longitudinal edge sides 8' to themselves in the area of outer sides 2, which requires little thermal energy, has additionally led to a direct connection in the area of outer side 2. Furthermore, the material of strip 12 penetrated into opening 15 has caused a covering or sealing of the exposed areas of barrier layer 5. Furthermore, the pressure application to strip 12 and to film substrate 1 has caused a certain degree of melting of strip 12, strip 12 thus having lost approximately half of its original thickness, for example; conversely, however, it has approximately twice the width as prior to the contacting with film substrate 1 and the corresponding pressure application, for example. Since barrier layer 5 is thus more difficult to melt or does not melt at all, this radial thinning and the simultaneous widening of strip 12 have led to the fact that the areas of barrier layer 5 of strip 12 which were still exposed in FIG. 2 have also been covered and thus do not contact inside 17 of tube body 18 anymore.

Thus, FIG. 3 shows the particularly advantageous connection in the area of the longitudinal weld seam or in the area of longitudinal edge sides 8'. This is because, firstly, there is a direct connection 19 in the area of outer side 2 or in the area of outer layer 3 of film substrate 1, an apparently continuous and seamless print of outer side 2 of film substrate 1 thus being achieved if cutting planes $S_1$ and $S_2$ are cut precisely enough, also because the connection is produced using little thermal energy and thus has little to no negative impact on outer side 2 or outer sides 2.

At the same time, an effective connection has been established both on inner side 13 of film substrate 1 and in the area of opening 15, namely via the material of strip 12, a very stable longitudinal weld seam of tube body 18 thus having been achieved. The mechanical stability is also ensured in that a corresponding part of barrier layer 5 is embedded in strip 12 in the area of longitudinal edge sides 8', barrier layer 5 contributing to the mechanical stabilization of the longitudinal weld seam. Additionally, the connection is particularly effective between strip 12 and inner side 13 of film substrate 1, because identical materials are connected to one another in this connection, which consequently establish a good and stable connection to one another; in particular, they are consequently well welded to one another. If, instead of the trimming strip, a strip is used whose surfaces can be welded to the inner surface, inner layer 7, or inner side 13, a material which cannot be welded to inner layer 7 can also be selected for outer layer 3.

Figure 4:
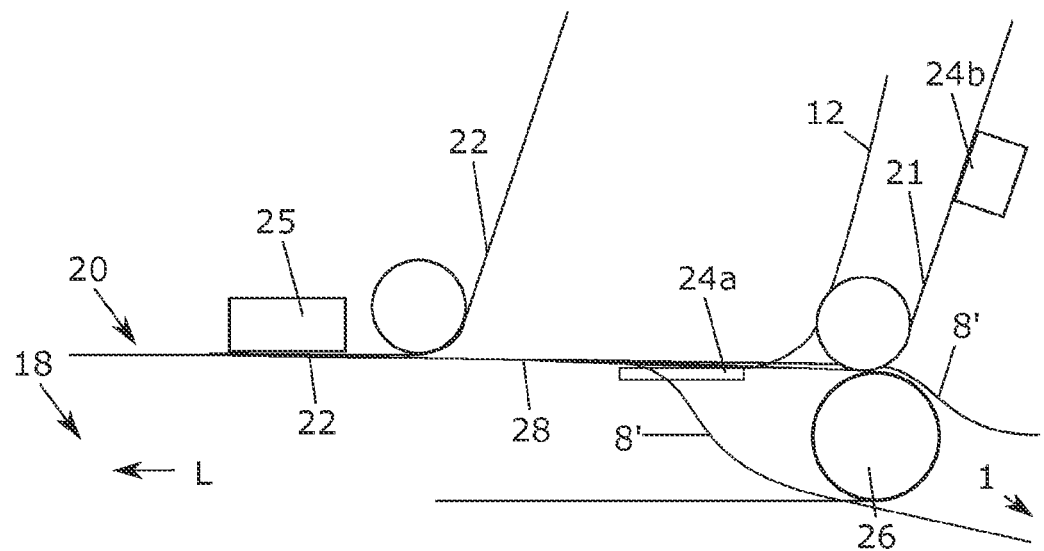
FIG. 4 shows a schematic illustration of a device according to the invention for producing tube bodies.

FIG. 4 shows a schematic illustration of a device according to the invention. An essentially plane film substrate 1 is fed from the right side, film substrate 1 running to the left in a longitudinal direction and, after leaving device 20, forming a flexible tube body 18 which is still endless and therefore is to be separated and to be connected to a tube head, if applicable. The reshaping of film substrate 1 shown in FIG. 1, in particular the cutting of film substrate 1, can be performed by means of cutting tools, in particular trimming tools (not shown in the illustration of FIG. 4), which have corresponding knives, in particular trimming knives. If a corresponding trimming strip is produced, it can consequently be temporarily stored on a storage means (not shown in FIG. 4) after it has been separated from film substrate 1.

The device also comprises two continuously circulating belts 21, 22, part of the entire belt being shown regarding outer belt 22 and inner belt 21.

Prior to or in parallel with a deforming of film substrate 1 into a corresponding tube shape around a mandrel 26 by means of corresponding deforming means, strip 12, which may be realized as a trimming strip, is fed to inner belt 21. Inner belt 21 and/or strip 12 can be preheated via inner heating means 24a, 24b, strip 12 thus being heated and, preferably plastically, softened before it is inserted into or fed to film substrate 1 deformed into the tube shape on inner belt 21, for example. For example, the deforming means can deform film substrate 1 into a tube shape whose longitudinal edge sides 8' then contact one another without overlapping in the area of the tip or of the tips of outer side 2, as shown, for example, in FIG. 2. In a subsequent step, the above-described connection between soft, warm strip 12 and film substrate 1 takes place, for example from initial contact point 28, starting from which a contact exists, preferably at contact points K, and starting from which the contact or the contact surface is increased in longitudinal direction L by corresponding contact pressure. After this connection has been established and strip 12 is cooling down and hardening again or has cooled down and hardened in a deformed shape partially flowed into the opening, a corresponding energy input is ensured by outer heating means 25, the energy input leading to a direct connection of longitudinal edge sides 8' to one another in the area of outer side 2 of film substrate 1.

REFERENCE SIGNS

1 film substrate
2 outer side
3 outer layer
4 layer structure
5 barrier layer
6 layer structure
7 inner layer
8, 8' longitudinal edge sides
9 tip
10 guiding means
12 strip
12.1 trimming strip
13 inner side
14 outer side
15 opening
16 edge sides
17 inside
18 tube body
19 connection
20 device
21 belt
22 belt
24 inner heating means
25 outer heating means
26 mandrel
27 feeding means
28 contact point
31 print
A opening angle
D thickness direction
B width
L longitudinal direction
K contact point
A opening angle
S1, S2 cutting plane
S3, S4 cutting plane

The invention claimed is:

1. A method for producing flexible tube bodies for packaging tubes from a film substrate (1) having an outer side (2) and having or consisting of at least one weldable plastic layer and comprising a first longitudinal edge side (8) extending in a longitudinal direction and a second longitudinal edge side (8) parallel thereto and spaced apart therefrom, the method comprising:
deforming the film substrate (1) into a tube shape and welding the two longitudinal edge sides (8) to one another, a longitudinal weld seam being formed in the process, a strip (12) being arranged in the area of the joint and/or of the longitudinal weld seam inside (17) the film substrate (1) deformed into the tube shape and being connected to the longitudinal edge sides (8) at least in some areas or sections,
wherein,
prior to the formation of the longitudinal weld seam, at least one longitudinal edge side (8') is reshaped in such a manner that the longitudinal edge sides (8, 8') of the film substrate (1) deformed into the tube shape contact one another radially only in an area of an outer side (2) via at least one tip (9) formed by the reshaping.

2. The method according to claim 1, wherein, in the course of the formation of the longitudinal weld seam, the outer side (2) of the film substrate (1) is connected, in the area of the at least one tip (9) of the longitudinal edge sides (8, 8') by heat after the inner side (13) facing away from the outer side (2) is connected to the strip (12).

3. The method according to claim 1, wherein when the at least one longitudinal edge side (8') of the film substrate (1) is reshaped, an edge extending obliquely in relation to a thickness direction (D) of the film substrate (1) is produced in each case, a bevel being oriented in such a manner that an opening (15) widening from the outer side (2) to the inner side is produced when the film substrate (1) is deformed into the tube shape.

4. The method according to claim 1, wherein the longitudinal edge sides (8') are reshaped in such a manner that an opening (15) encloses an angle of 5° to 50°.

5. The method according to claim 1, wherein both longitudinal edge sides (8') of the film substrate (1) are reshaped, tips (9) formed by the reshaping thus contacting one another edge to edge, when the film substrate (1) is deformed into the tube shape (2).

6. The method according to claim 1, wherein, in the course of a trimming step, at least one longitudinal edge side (8) is cut in the longitudinal direction (L) by means of a trimming tool, a trimming strip (12.1) separated from the film substrate (1) being produced in the process, wherein the trimming strip is arranged as a strip (12) in the area of the joint of the longitudinal edge sides (8, 8') and/or of the longitudinal weld seam within the film substrate (1) deformed into the tube shape and is welded to the film substrate (1).

7. The method according to claim 6, wherein during or after the separation of the trimming strip (12.1) from the film substrate (1), prior to the feeding into the inside (17) of the film substrate (1) deformed into the tube shape, at least one side of the trimming strip (12.1) itself is cut in the longitudinal direction (L) by means of trimming tools.

8. The method according to claim 6, wherein between the separation of the trimming strip (12.1) from the film substrate (1) and its insertion into the inside (17) of the film substrate (1) deformed into the tube shape, the method further comprising temporarily storing the trimming strip (12.1) on a storage.

9. The method according to claim 1, further comprising heating the strip (12) and inserting the strip (11) into the inside (17) of the film substrate (1) deformed into the tube body in a heated and therefore softened state and comes into contact with the longitudinal edge sides (8, 8'), before the outer side (2) is welded to itself.

10. The method according to claim 9, wherein during the connection to the film substrate, the strip (12) is widened transverse to the longitudinal direction (L), the ratio of a width after the connection to the film substrate in relation to an original width thus being greater than 1.5, the strip (12) or a trimming strip (12.1) also being flattened transverse to the longitudinal direction (L), at the same time, the ratio of a height after the connection to the film substrate in relation to the original height thus being smaller than ⅔.

11. The method according to claim 1, wherein the strip (12) is placed on a circulating endless belt (21) and is inserted into the inside (17) of the film substrate (1) deformed into the tube body on the belt (21).

12. A flexible tube body for packaging tubes, made of a film substrate (1) having an outer side (2), the film substrate (1) having or consisting of at least one weldable plastic layer and comprising a first longitudinal edge side (8) extending in a longitudinal direction (L) and a second longitudinal edge side (8) parallel thereto and spaced apart therefrom, the film substrate (1) being deformed into a tube shape and the two longitudinal edge sides (8) being welded to one another by means of a longitudinal weld seam, a strip (12) being arranged in the area of the joint and/or of the longitudinal weld seam inside (17) the film substrate (1) deformed into the tube shape and being connected, to the longitudinal edge sides (8) at least in some areas or sections,
wherein
at least one longitudinal edge side (8') is reshaped, in such a manner that the longitudinal edge sides (8, 8') of the film substrate (1) deformed into the tube shape are directly connected to one another radially only in the area of the outer side (2) via at least one tip (9) formed by the reshaping.

13. The tube body according to claim 12, wherein the at least one reshaped longitudinal edge side (8') of the film substrate (1) has a cutting edge which extends obliquely in relation to a thickness direction (D) of the film substrate (1) in each case, a bevel being oriented in such a manner that an opening (15) widening from the outer side (2) to the inner side in the radial direction is produced when the film substrate (1) is deformed into the tube shape.

14. The tube body according to claim 12, wherein the longitudinal edge sides (8') are reshaped in such a manner that an opening (15) encloses an angle or opening angle of 5° to 50°.

15. The tube body according to claim 12, wherein an opening (15) is partially filled with material of the strip (12) with the exception of the outer side (2) and/or of the outer layer (3).

16. The tube body according to claim 12, wherein both longitudinal edge sides (8') of the film substrate (1) are reshaped in such a manner that tips (9) formed by the reshaping are directly connected to one another, edge to edge, radially in an area of the outer side (2) when the film substrate (1) is deformed into the tube shape.

17. The tube body according to claim 12, wherein the strip (12) is formed by a trimming strip (12.1) of the film substrate (1), the trimming strip (12.1) being separated from the film substrate (1) in the course of a trimming process.

18. A device for producing flexible tube bodies for packaging tubes from a film substrate (1) having an outer side (2)

and having or consisting of at least one weldable plastic layer and comprising a first longitudinal edge side (8) extending in a longitudinal direction and a second longitudinal edge side (8) parallel thereto and spaced apart therefrom, the film substrate (1) being deformed into a tube shape by a mandrel and the two longitudinal edge sides being welded to one another, a longitudinal weld seam being formed in the process, a strip (12) being arranged in the area of the joint and/or of the longitudinal weld seam inside (17) the film substrate (1) deformed into the tube shape by a circulating contact belt and being connected to the longitudinal edge sides (8) at least in some areas or sections by a welding unit, further comprising a knife for reshaping at least one longitudinal edge side (8') before the longitudinal weld seam is formed, the mandrel for forming the tube shape being realized in such a manner that the longitudinal edge sides (8, 8') of the film substrate (1) deformed into the tube shape contact one another edge to edge, radially only in the area of the outer side (2) via at least one tip (9) formed by the knife.

\* \* \* \* \*